(12) United States Patent
Caye et al.

(10) Patent No.: US 10,315,540 B2
(45) Date of Patent: Jun. 11, 2019

(54) INERTIA STOP LINK FOR STADIUM STYLE SEAT CUSHION STOWED POSITIONING

(71) Applicant: FORD GLOBAL TECHNOLOGIES, LLC, Southfield, MI (US)

(72) Inventors: Mark Caye, Allen Park, MI (US); Glenn Scott, Dexter, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 317 days.

(21) Appl. No.: 15/370,332

(22) Filed: Dec. 6, 2016

(65) Prior Publication Data

US 2018/0154804 A1 Jun. 7, 2018

(51) Int. Cl.
*B60N 2/30* (2006.01)
*B60N 2/42* (2006.01)
*B60N 2/90* (2018.01)
*B60N 2/433* (2006.01)

(52) U.S. Cl.
CPC ......... *B60N 2/3045* (2013.01); *B60N 2/4221* (2013.01); *B60N 2/433* (2013.01); *B60N 2/919* (2018.02)

(58) Field of Classification Search
CPC .. B60N 2/3045; B60N 2/4221; B60N 2/4228; B60N 2/919; B60N 2/305; B60N 2/433; B60N 2/682
USPC ........... 297/216.1, 335, 332, 331; 296/65.05, 296/68.1
See application file for complete search history.

(56) References Cited

U.S. PATENT DOCUMENTS

| 2,873,794 | A | 2/1959 | Leslie et al. |
| 4,118,067 | A | 10/1978 | Tanaka |
| 4,252,370 | A | 2/1981 | Kluting et al. |
| 4,318,569 | A | 3/1982 | Bilenchi et al. |
| 4,365,838 | A | 12/1982 | Berg |
| 4,707,010 | A | 11/1987 | Croft |
| 4,909,571 | A | 3/1990 | Vidwans et al. |
| 4,988,134 | A | 1/1991 | Vidwans et al. |
| 6,012,771 | A | 1/2000 | Shea |

(Continued)

FOREIGN PATENT DOCUMENTS

| EP | 0 978 414 | 2/2000 |
| EP | 1 407 923 | 4/2004 |
| EP | 1 407 923 A1 | 4/2004 |

*Primary Examiner* — Milton Nelson, Jr.
(74) *Attorney, Agent, or Firm* — Vichit Chea; Price Heneveld LLP

(57) ABSTRACT

A motor vehicle seating assembly comprises a seat support bracket, a lower seat cushion mounted to the seat support bracket, and a latch pivotally mounted to the lower seat cushion. An inertia link is pivotally and operatively coupled with the lower seat cushion and operatively coupled with the latch, the inertia link having a first rotational position corresponding to an unlocked condition of the latch, allowing movement of the lower seat cushion between a raised stowed position and a lowered deployed position, and a second rotational position corresponding to a locked condition of the latch, preventing movement of the lower seat cushion from the raised stowed position to the lowered deployed position. The inertia link moves from the first rotational position to the second rotational position upon a predetermined deceleration of the motor vehicle.

20 Claims, 7 Drawing Sheets

(56) References Cited

U.S. PATENT DOCUMENTS

| | | | | |
|---|---|---|---|---|
| 6,481,799 B1* | 11/2002 | Whalen | ................... | B60N 2/20 |
| | | | | 297/378.11 |
| 6,655,724 B1 | 12/2003 | Yoshino et al. | | |
| 7,374,242 B2* | 5/2008 | Champ | ............... | B60N 2/3031 |
| | | | | 296/65.05 |
| 7,780,234 B2 | 8/2010 | Grable et al. | | |
| 8,104,834 B2* | 1/2012 | Moegling | ............... | B60N 2/20 |
| | | | | 297/316 |
| 8,376,442 B1* | 2/2013 | Brantley | ................. | B60N 2/24 |
| | | | | 296/65.09 |
| 8,752,898 B2* | 6/2014 | Gleason | .................. | B60N 2/22 |
| | | | | 297/354.12 |
| 9,352,672 B2* | 5/2016 | Elton | ...................... | B60N 2/43 |
| 9,573,490 B1* | 2/2017 | Poniatowski | ........ | B60N 2/2245 |
| 2008/0164711 A1* | 7/2008 | Zambon | ............... | B60N 2/3031 |
| | | | | 296/65.03 |

\* cited by examiner

INERTIA STOP LINK FOR STADIUM STYLE SEAT CUSHION STOWED POSITIONING

FIELD OF THE INVENTION

The present invention generally relates to an apparatus and method for use on an automotive seat assembly having a stadium style lower seat cushion that may be raised to a raised stowed position, and more particularly, to an inertia stop link to prevent movement of the stadium style lower seat cushion when in the raised stowed position in the event of sudden deceleration of the motor vehicle.

BACKGROUND OF THE INVENTION

Motor vehicle are often equipped with so-called "stadium style" lower seat cushions, particularly as applied to rear seating positions in light and medium duty trucks. Such lower seat cushions may be held in the lowered deployed position via gravity and with an over-center detent. When the lower seat cushion is pushed up to a "stadium" or raised stowed position, it is held in place with a latch and manually actuated handle release. A latch is desired to hold the cushion in the raised position during a sudden deceleration event, where the vehicle may experience deceleration loads of 2 to 10 G in the forward direction. However, the handle release is costly, prone to damage, and sometimes inconvenient. A device that would prevent unwanted movement of the stadium style lower seat cushion when in the raised stowed position without the need for a manually actuated handle release is desired.

SUMMARY OF THE INVENTION

According to one aspect of the present invention, a motor vehicle seating assembly comprises a seat support bracket, a lower seat cushion assembly comprising a lower seat cushion and a frame assembly pivotally coupled at a rear portion thereof to the seat support bracket and pivotable between a lowered deployed position and a raised stowed position, a stop surface provided on the seat support bracket, and a latch pivotally coupled to the frame assembly of the lower seat cushion, the latch having a bearing surface adapted for engagement against the stop surface and having an unlocked condition, wherein the bearing surface of the latch may move relative to the stop surface, and a locked condition, wherein the bearing surface of the latch is retained in engagement against the stop surface when the lower seat cushion assembly is in the raised stowed position. An inertia link is pivotally and operatively coupled with the frame assembly of the lower seat cushion assembly and operatively coupled with the latch, the inertia link having a first rotational position corresponding to the unlocked condition of the latch, allowing movement of the lower seat cushion assembly from the raised stowed position to the lowered deployed position, and a second rotational position corresponding to the locked condition of the latch, preventing movement of the lower seat cushion assembly from the raised stowed position to the lowered deployed position. The inertia link moves from the first position to the second position upon a predetermined deceleration of the motor vehicle.

According to another aspect of the present invention, a seating assembly comprises a support bracket comprising a stop surface, a seat cushion assembly pivotally mounted at a rear portion thereof to the support bracket, a latch pivotally mounted to the frame assembly of the seat cushion assembly in a raised stowed position having a locked condition retaining a bearing surface of the latch against the stop surface, and a pivotal inertia link placing the latch in the locked condition upon a predetermined deceleration.

According to yet another aspect of the present invention, a method of retaining a lower seat cushion assembly of a motor vehicle in a raised stowed position upon a predetermined deceleration of the motor vehicle is disclosed, wherein the lower seat cushion assembly comprises a frame assembly and a lower seat cushion joined with the frame assembly, wherein the frame assembly is pivotally mounted to a seat support bracket and the lower seat cushion assembly is pivotable between a lowered deployed position and the raised stowed position. The method comprises the steps of pivotally mounting a latch to the frame assembly of the lower seat cushion assembly, the latch having an unlocked condition, wherein a bearing surface of the latch may move relative to a stop surface on the seat support bracket, and a locked condition, wherein the bearing surface of the latch is retained against the stop surface on the seat support bracket, pivotally mounting an inertia link to the frame assembly of the lower seat cushion assembly, the inertia link having a first position corresponding to the unlocked condition of the latch allowing movement of the lower seat cushion assembly between the raised stowed position and the lowered deployed position and a second position corresponding to the locked condition of the latch preventing movement of the lower seat cushion assembly from the raised stowed position to the lowered deployed position, and moving the inertia link from the first position to the second position upon the predetermined deceleration of the motor vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
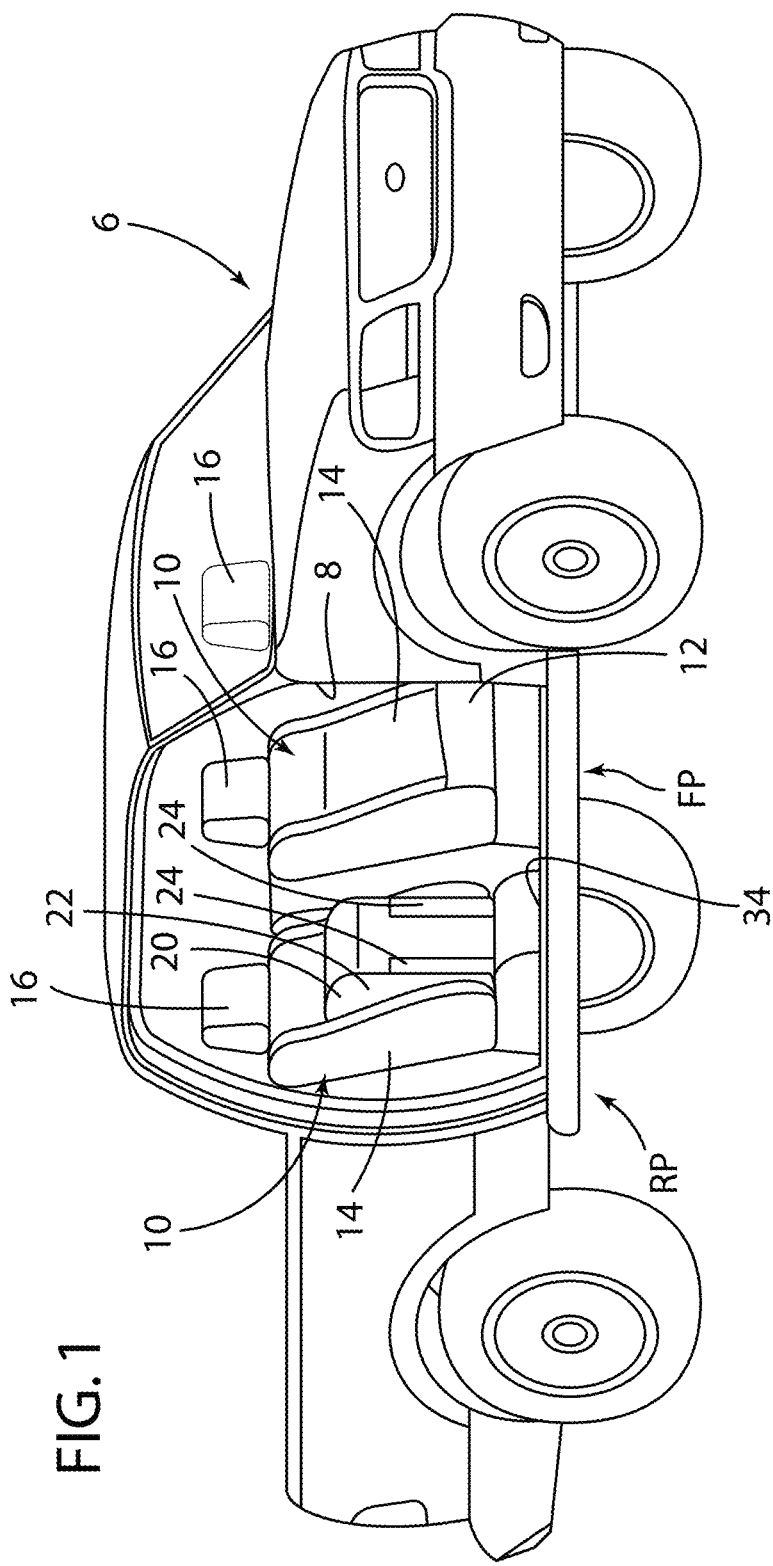
FIG. 1 is a perspective view of a vehicle having the passenger side doors removed and showing a motor vehicle seating assembly provided with a so-called "stadium style" lower seat cushion according to an embodiment of the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates one or more motor vehicle seating assemblies for a motor vehicle 6 installed within an occupant compartment 8 of the motor vehicle 6. As is typical, the seating assembly 10 has a lower seat assembly 12 and an upwardly extending seat back assembly 14. The seat back assembly 14 preferably supports a head rest 16 thereon. In the case of the forward seating positions FP, the upwardly extending seat back assembly 14 may be pivotally coupled with the lower seat assembly 12, such that the upwardly extending seat back assembly 14 can be moved between upright and inclined positions relative to the lower seat assembly 12. The head rest 16 is operably, and preferably slidably, connected with the seat back assembly 14 and also positioned in a variety of positions and heights relative to the upwardly extending seat back assembly 14 to support the head and neck of a driver or a passenger.

Figure 2:
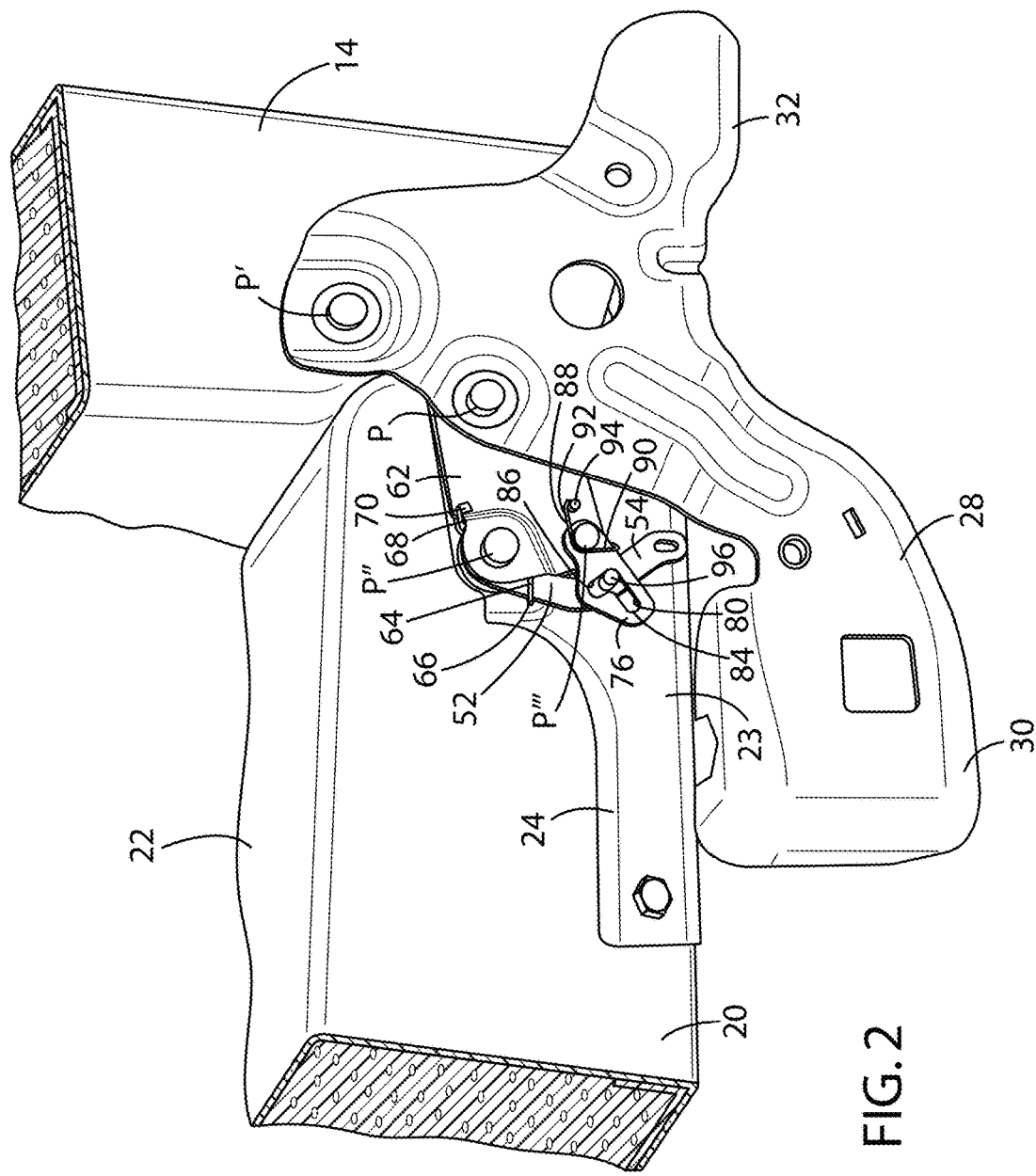
FIG. 2 is a front side perspective view of the right frame assembly and seat support bracket of the motor vehicle seating assembly of FIG. 1 in the lowered deployed position.
Figure 3:
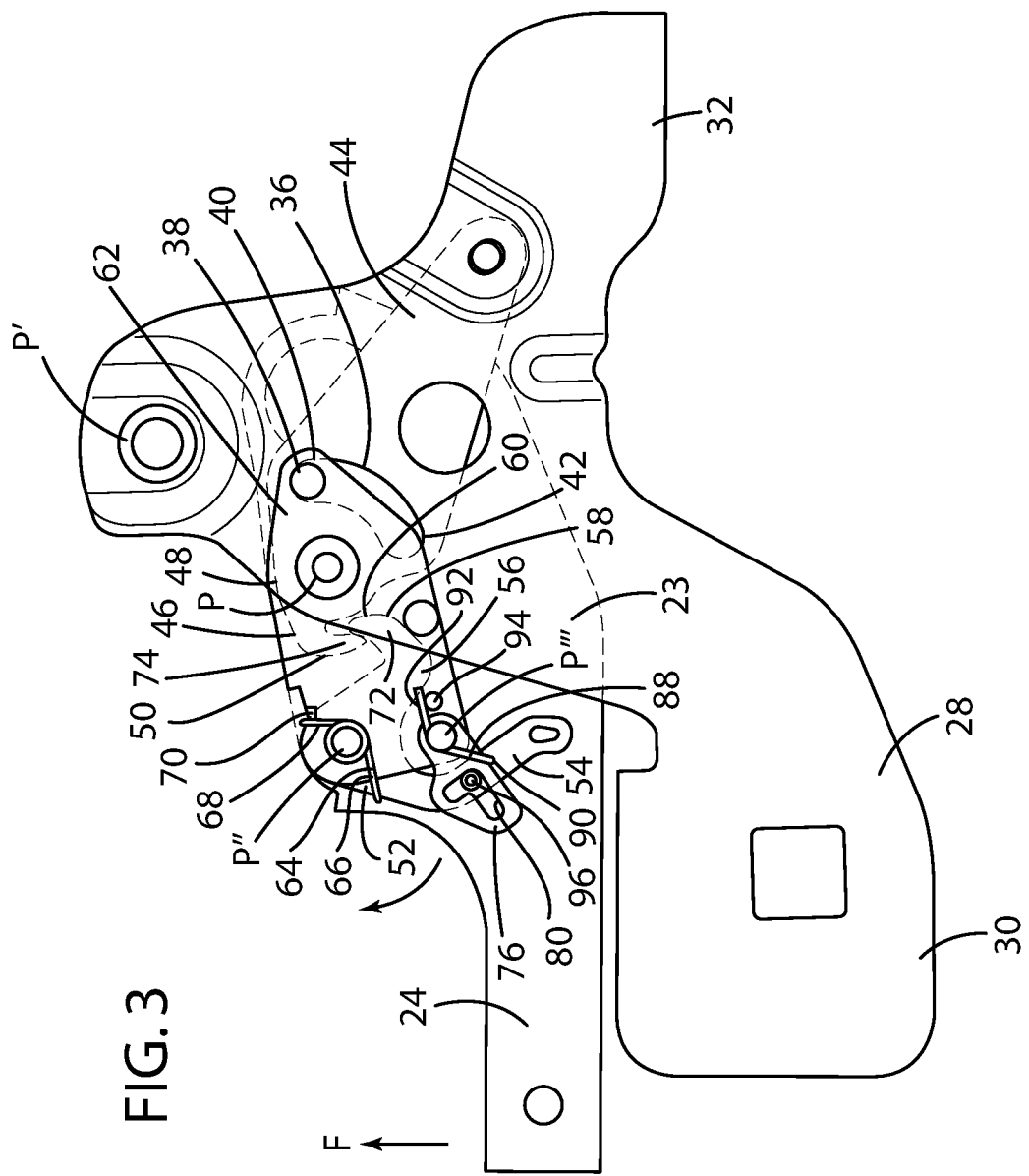
FIG. 3 is a side view of the right frame assembly and seat support bracket of the motor vehicle seating assembly of FIG. 1 in the lowered deployed position.
Figure 4:
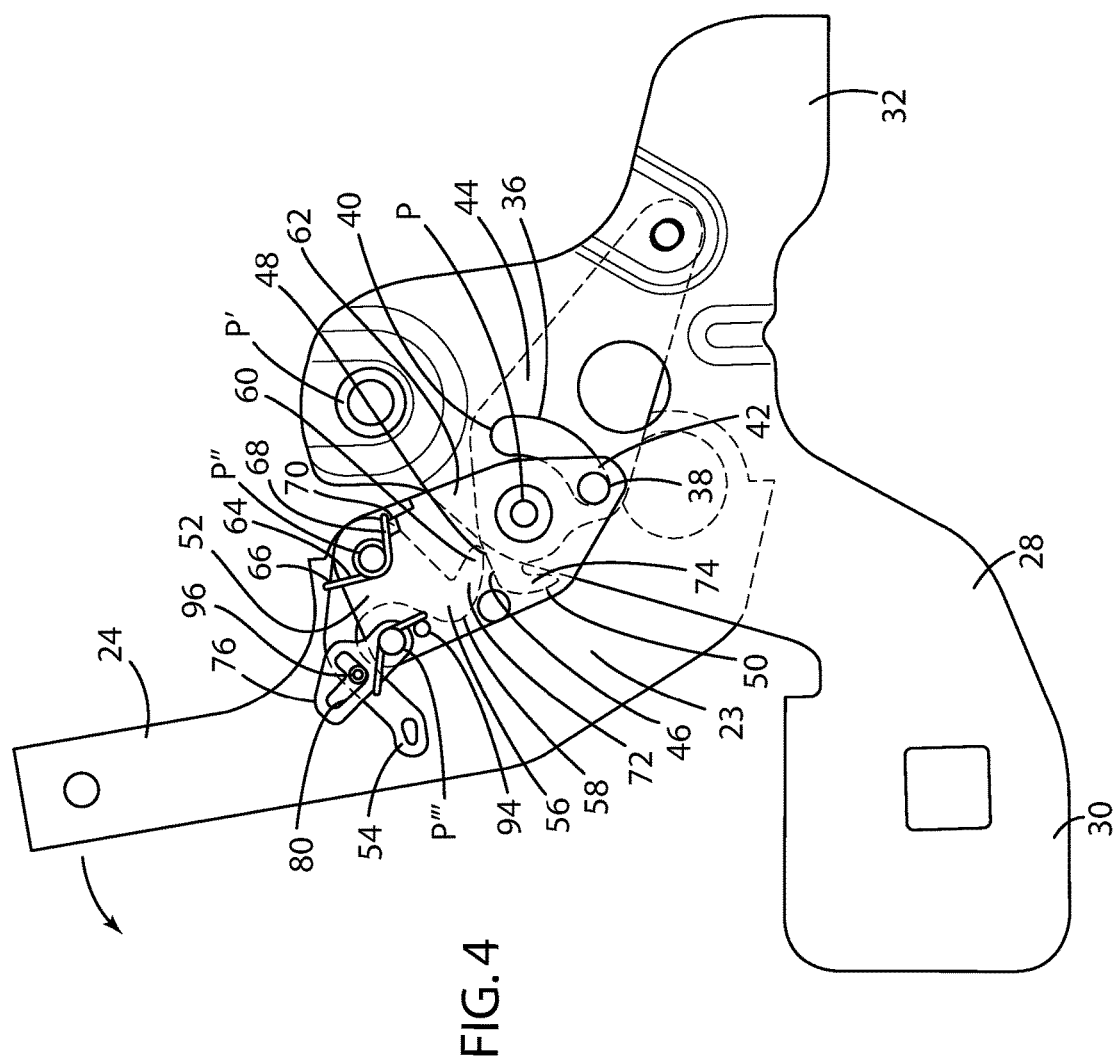
FIG. 4 is side view of the right frame assembly and seat support bracket of the motor vehicle seating assembly of FIG. 1 in the raised stowed position.

In the case of the rearward sitting positions RP, the configuration of the seating assembly 10 may employ the use of seating assemblies provided with a so-called "stadium style" lower seating assembly 20. This is particularly so as applied to rear seating positions RP in light and medium duty trucks. The "stadium style" lower seating assembly 20 includes a lower seat cushion 22 and a frame assembly 24. As shown in FIG. 2 the lower seat cushion 22 is pivotally coupled via the frame assembly 24 at a rear portion 23 thereof to a seat support bracket 28, such that the lower seating assembly 20 is pivotable between a lowered deployed position and a raised stowed position through a pivot P, as shown in FIGS. 3 and 4, respectively. The seat support bracket 28 has a forward leg 30 and a rearward leg 32, each of which are adapted for installation to a floorboard 34 of the motor vehicle 6. The seat support bracket 28 further may be optionally provided with an upper pivot P' to which the upwardly extending seat back assembly 14 may be pivotably attached to the seating assembly 10.

It should be noted that the frame assembly 24 and support bracket 28 shown in FIG. 2 are adapted for use on the right side of the lower seating assembly 20, and that a corresponding frame assembly 24 and seat support bracket 28 may be provided on an opposite left side of the motor vehicle seating assembly 10 (not shown). The remaining features of the frame assembly 24 and seat support bracket 28 described herein below may also be provided on the opposite side of the seating assembly 10, but are preferably omitted due to weight and cost considerations.

Preferably, the seat support bracket 28 is provided with a semicircular slot 36 extending approximately 90° and defining the arc of travel of a frame assembly guide pin 38 received within the semicircular slot 36. When the lower seat cushion assembly 20 is in the lower deployed position, the frame assembly guide pin 38 is in abutting relation with an upper end 40 of the semicircular slot 36 so that the lower seating assembly 20 may present a normal seat, with the lower seat cushion 22 extending horizontally upon which an occupant may be supported, as shown in FIG. 3. When the lower seat cushion assembly 20 is in the raised stowed position, the frame assembly guide pin 38 is in abutting relation with a lower end 42 of the semicircular slot 36, with the lower seat cushion 22 extending vertically upward, as shown in FIG. 4. With the lower seat cushion assembly 20 in the raised stowed position, additional floor space and room in the occupant compartment 8 may be obtained, as shown in FIG. 1.

Figure 5:
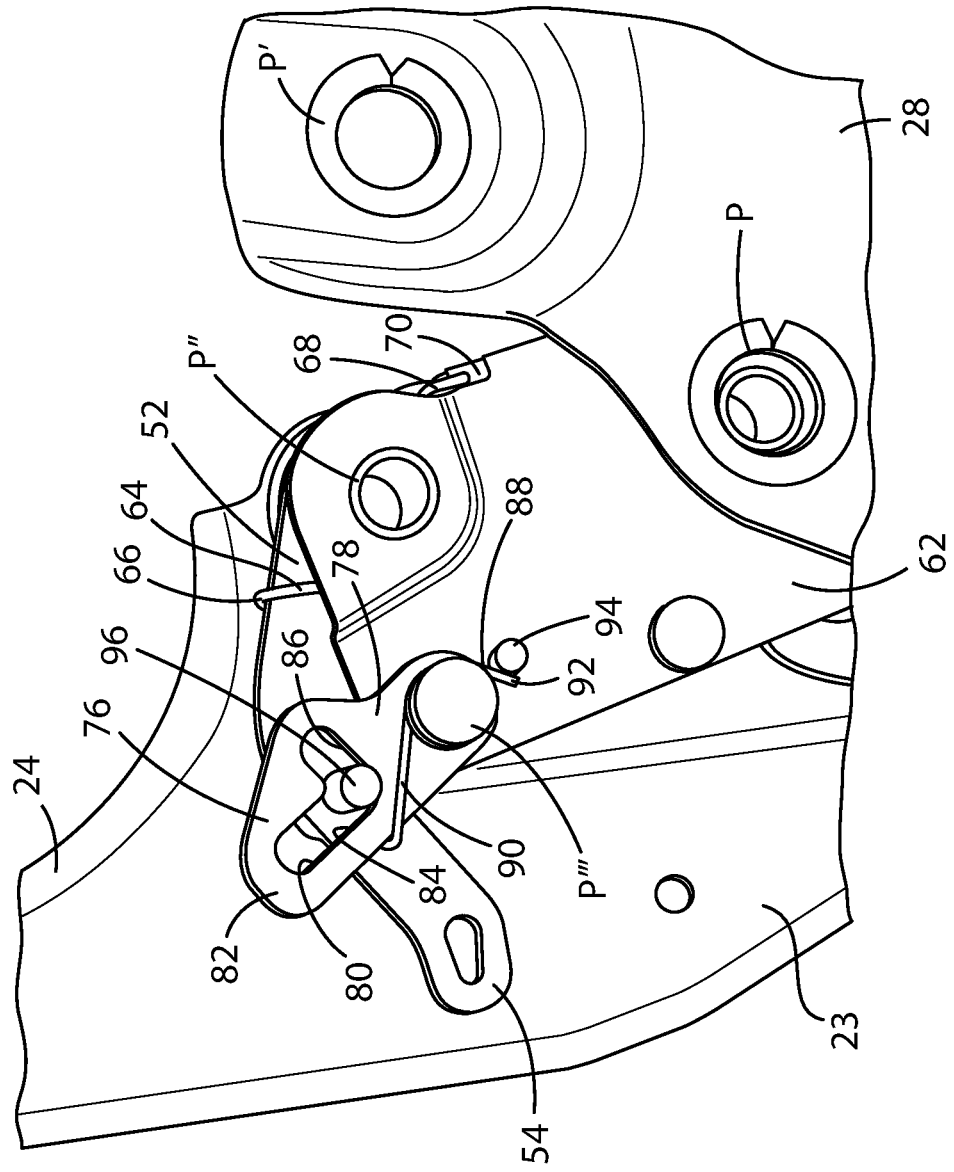
FIG. 5 is a front side perspective view of the upper extending arm of the latch and the inertia link in the first rotational position of the motor vehicle seating assembly of FIG. 1 in the raised stowed position.
Figure 6:
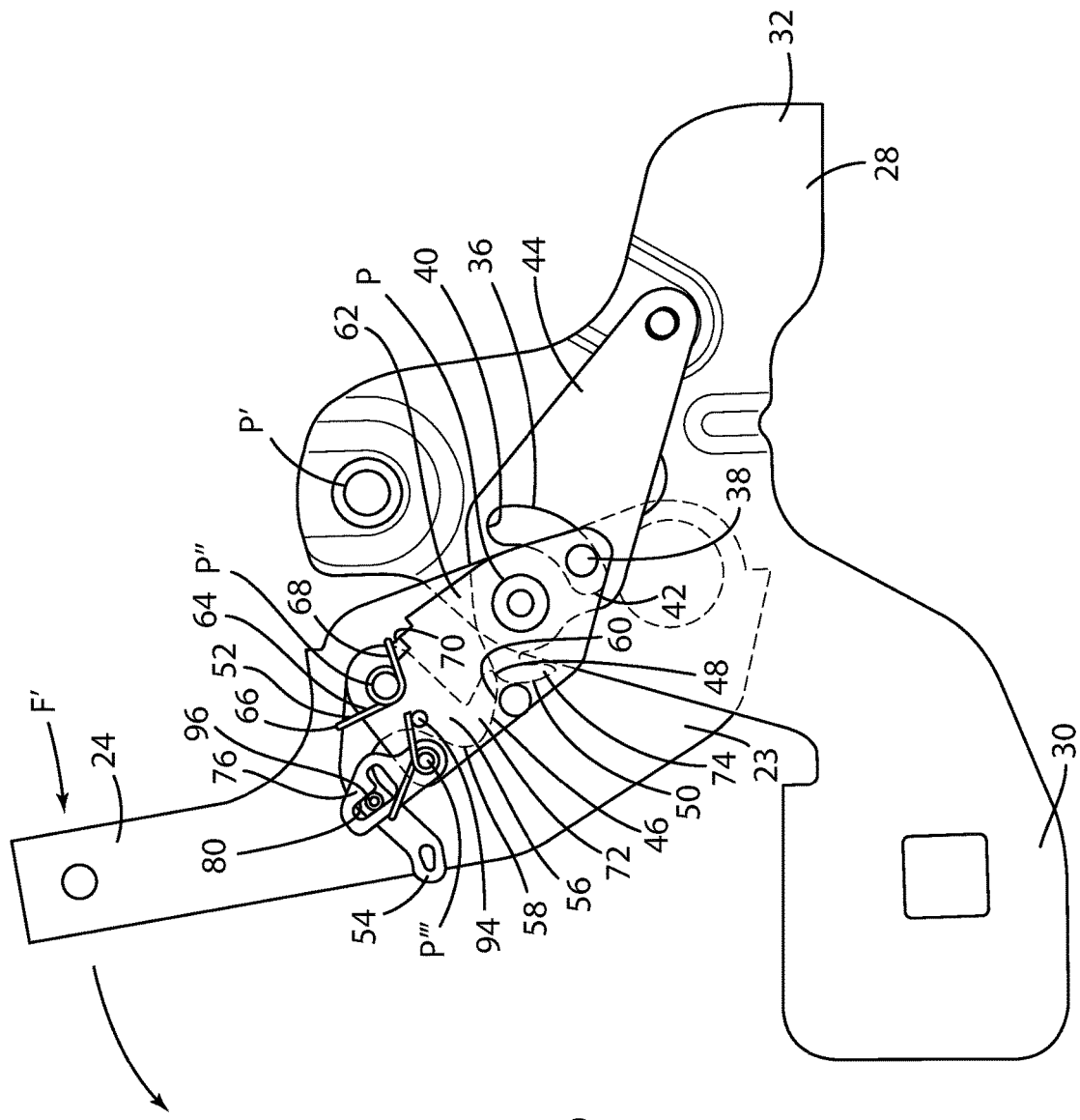
FIG. 6 is side view of the inertia link in the first rotational position as the motor vehicle seating assembly of FIG. 1 is normally moved from the raised stowed position.

In accordance with the present disclosure, a stop plate 44 is preferably mounted to the seat support bracket 28 proximate the pivot P, and is preferably provided with a convex curvilinear upper portion 46 that defines a stop surface 48 proximate a forward end 50 of the stop plate 44. Similarly, a latch 52 is preferably pivotally mounted to the frame assembly 24 of the lower seat cushion assembly 20 through a pivot P'''. Preferably, the latch 52 has an upper extending arm 54 and a lower descending arm 56, the lower descending arm 56 having a convex curvilinear lower portion 58 that defines a bearing surface 60. In order to protect the rotation of the latch 52 from any interference and/or binding, the latch 52 is preferably rotationally interposed between the frame assembly 24 and an outer bracket 62 that extends over and substantially overlays the latch (except the upper extending arm 54), the front end of the stop plate 44, and pivot P''', as best seen in FIGS. 2 and 5.

The latch 52 further preferably includes a latch torsion spring 64 mounted about the pivot P''' of the latch. The latch torsion spring 64 is provided with a first leg 66 operably coupled to the upper extending arm 54 of the latch 52, urging the latch 52 in the counterclockwise direction, as shown in FIGS. 3-7, and a second leg 68 restrained by a stop 70 on the outer bracket 62. When the lower seat cushion assembly 20 is in the lowered deployed position, the latch torsion spring 64 urges an over-center detent 72 on the lower descending arm 56 of the latch 52 against an over-center detent 74 on the forward end 50 of the stop plate 44. In addition to gravity, the lower seat cushion assembly 20 is thus positively restrained in the lowered deployed position, as shown in FIG. 3.

Similarly, when the lower seat cushion assembly 20 is in the raised stowed position, the latch torsion spring 64 urges the bearing surface 60 of the lower descending arm 56 of latch 52 against the stop surface 48 of the stop plate 44 to resiliently maintain the lower seat cushion assembly 20 in the raised stowed position. The lower seat cushion 22 is thus restrained in the raised stowed position via the bearing surface 60 provided on the latch 52 that engages the stop surface 48 provided in the stop plate 44, as shown in FIG. 4.

In prior "stadium style" lower seat cushions, after the lower seat cushion assembly 20 was placed in the raised stowed or "stadium" position, it was necessary to manually actuate a handle release (not shown) operably coupled with the latch 52 to overcome the latch torsion spring 64 and thereby release the latch 52 so that the lower seat cushion assembly 20 could be rotated to the lowered deployed position. However, such a handle release has been found to be costly and prone to damage. Operation of the manually actuated handle release may also sometimes be inconvenient. However, eliminating the ability to restrain the lower seat cushion assembly 20 in the raised stowed position could cause the lower seat cushion assembly 20 to undesirably rotate from the raised stowed position to the lower deployed position in the event of sudden deceleration of the motor vehicle 6, where the motor vehicle 6 may experience deceleration loads of 2 to 10 G in the forward direction.

In accordance with the present disclosure and relating to the lower seat cushion assembly 20 being maintained in the raised stowed position, the lower seat cushion assembly 20 may be returned to the lowered deployed position without the need to manually actuate a handle release. The latch 52 accordingly has an unlocked condition, wherein the bearing surface 60 of the latch may move relative to the stop surface 48 of the stop plate 44, and a locked condition, wherein the bearing surface 60 of the latch 52 is retained in engagement against the stop surface 48 of the stop plate 44 when the lower seat cushion assembly 20 is in the raised stowed position.

For that reason, an inertia link 76 is provided that is pivotally and operatively coupled with the frame assembly 24 coupled to the lower seat cushion 22 via a pivot P''' and operatively coupled with the latch 52. The inertia link 76 is preferably mounted at a first end 78 to the outer bracket 62, as shown in FIG. 5, and comprises an L-shaped slot 80 at an opposite second end 82 of the inertia link 76. The L-shaped slot 80 is provided with a displacement slot portion 84 orientated substantially in line with the pivot P''' of the inertia link 76 and a stop slot portion 86 orientated substantially orthogonally to the displacement slot portion 84.

The inertia link 76 preferably includes an inertia link torsion spring 88 mounted about the pivot P''' of the inertia link 76. The inertia link torsion spring 88 is similarly provided with a first leg 90 operably coupled to the inertia link 76, urging the inertia link 76 to a first rotational position when the lower seat cushion assembly 20 is in the raised stowed position. The inertia link torsion spring 88 also includes a second leg 92 operably coupled with the lower seat cushion assembly 20 via stop 94 mounted on the outer bracket 62, which is in turn mounted to the frame assembly 24.

The upper extending arm 54 of the latch 52 preferably comprises a latch pin 96 which is slidably received within the L-shaped slot 80. The latch pin 96 normally translates within the displacement slot portion 84 of the L-shaped slot 80 when the lower seat cushion assembly 20 is pivoted between the lowered deployed position and the raised stowed position, and the latch 52 is rotated clockwise as the convex curvilinear bearing surface 60 of the lower descending arm 56 of the latch 52 moves relative to the convex curvilinear stop surface 48 of the stop plate 44. The latch pin 96 translates within the stop slot portion 86 only in the event of a sudden deceleration of the motor vehicle 6, as further discussed below.

Figure 7:
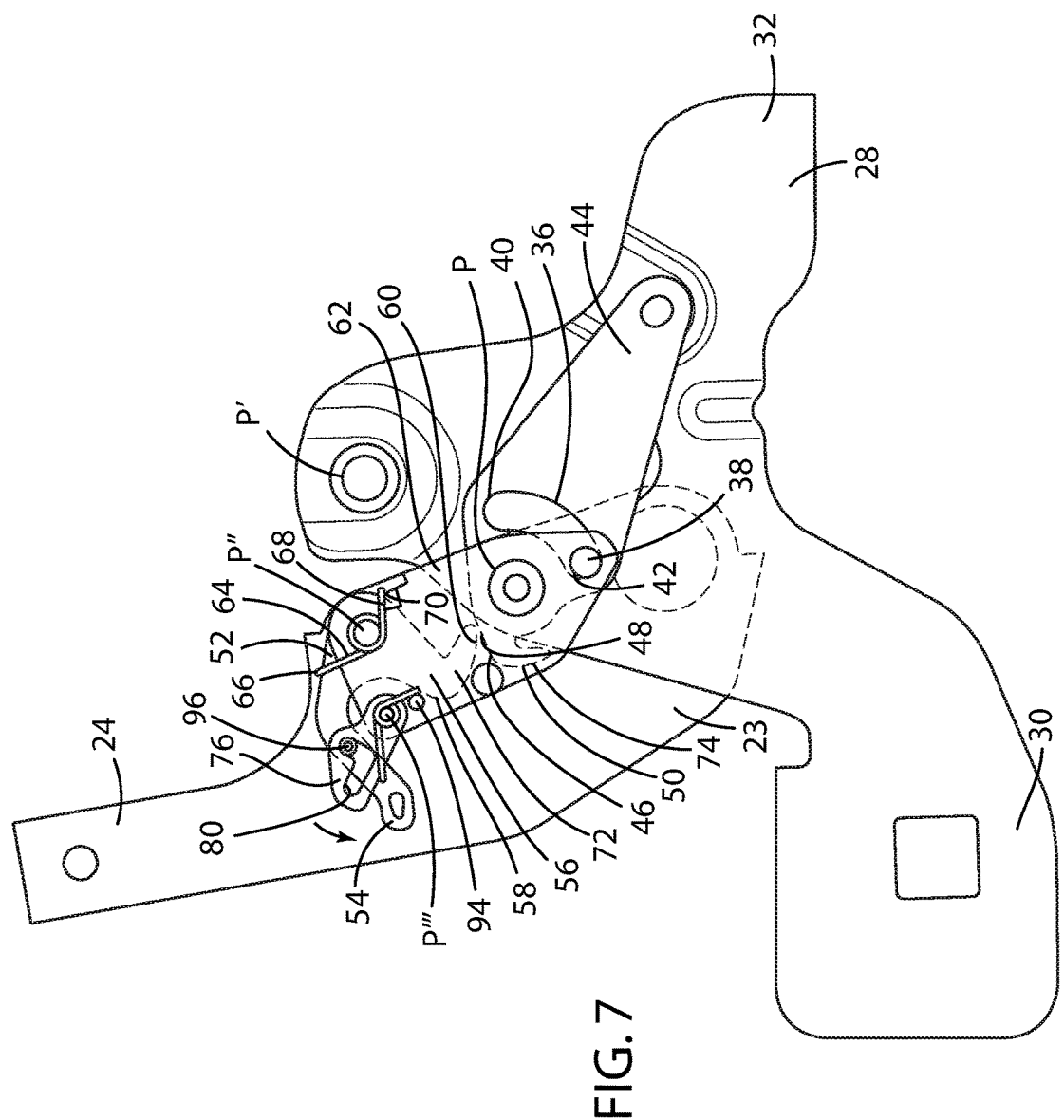
FIG. 7 is side view of the inertia link in the second rotational position as the motor vehicle seating assembly of FIG. 1 experiences a sudden deceleration event.

The inertia link 76 thus has a first rotational position, as shown in FIG. 4, that corresponds to the unlocked condition of the latch 52 and that allows movement of the latch pin 96 within the displacement slot portion 84 of the L-shaped slot 80 and thereby allows movement of the lower seat cushion assembly 20 between the raised stowed position and the lowered deployed position. The inertia link 76 also has a second rotational position, as shown in FIG. 7, corresponding to the locked condition of the latch 52, whereby the latch pin 96 moves along the stop slot portion 86 of the L-shaped slot 80 and thereby prevents movement of the lower seat cushion assembly 20 from the raised stowed position to the lowered deployed position.

In operation, when the lower seat cushion assembly 20 is in the lowered deployed position, the over-center detents 72, 74 of both the lower descending arm 56 of the latch 52 and the forward end 50 of the stop plate 44 retain the lower seat cushion assembly 20 in position. When and as the lower seat cushion assembly 20 is raised upward toward its raised stowed position, the operator must apply an clockwise force F against the urging of latch torsion spring 64 in order to rotate the lower seat cushion assembly 20 and attached latch 52 clockwise about pivot P''. As the latch 52 continues to rotate clockwise, the over-center detent 72 on the lower descending arm 56 of the latch 52 is rotated away from and is disengaged from the over-center detent 74 on the forward end 50 of the stop plate 44.

As the lower seat cushion assembly 20 continues to be rotated upwardly, the convex curvilinear bearing surface 60 of the lower descending arm 56 of the latch 52 is in sliding and rotational engagement with the convex curvilinear stop surface 48 of the stop plate 44. The latch 52 rotates clockwise, and the latch pin 96 slides outwardly within the displacement slot portion 84 of the L-shaped slot 80, while at the same time the lower descending arm 56 of the latch 52 is urged to rotate counterclockwise by the latch torsion spring 64. As the lower seat cushion 22 of the lower seat cushion assembly 20 reaches the substantially vertical position, the bearing surface 60 of the lower descending arm 56 of the latch rotates into an abutting and engaged position relative to the stop surface 48 of the stop plate 44. Preferably, the frame assembly guide pin 38 within the semicircular slot 36 allows the lower seat cushion assembly 20 to rotate slightly over center so that the latch torsion spring 64 can fully rotate the latch 52 in the counterclockwise direction to provide complete engagement of the bearing surface 60 against the stop surface 48.

In accordance with the present disclosure, the lower seat cushion assembly 20 may be retained in the raised stowed position and released therefrom without the need for manual actuation of a handle release. That is, once in the raised stowed position, the lower seat cushion assembly 20 is generally prevented from counterclockwise rotation toward the lowered deployed position by the urging of the latch torsion spring 64 on the upper extended arm 54 of the latch 52, which places a sufficient force against the interface of the bearing surface 60 of the lower descending arm 56 of the latch 52 and the stop surface 48 of the stop plate 44 to hold the lower seat cushion assembly 20 in place under normal conditions. However, the lower seat cushion assembly 20 can be readily moved when an operator applies a counter-clockwise force F' against the lower seat cushion assembly 20, again against the urging of the latch torsion spring 64, in order to rotate the latch 52 about pivot P''' counterclockwise. As the lower seat cushion assembly 20 rotates downward in a counterclockwise direction and the latch 52 rotates in a clockwise direction relative to the lower seat cushion assembly 20, the bearing surface 60 of the lower descending arm 56 of the latch 52 slides and rotates relative to the stop surface 48 of the stop plate 44, while the latch pin 96 again slides outwardly within the displacement slot portion 84 of the L-shaped slot 80.

Thus, in both directions of rotation of the lower seat cushion assembly 20, the latch pin 96 is displaced within the displacement slot portion 84 of the L-shaped slot 80 as the lower seat cushion assembly 20 is pivoted between the lowered deployed position and the raised stowed position, as the bearing surface 60 of the latch 52 moves relative to the stop surface 48 of the stop plate 44. The inertia link 76 is maintained in the first rotational position by the urging of the inertia link torsion spring 88 to facilitate movement of the latch pin 96 within the displacement slot 84.

However, in the event of a sudden deceleration of the motor vehicle 6 exceeding a predetermined deceleration, the mass of the inertia link 76 rotates the inertia link 76 forward and counterclockwise, against the urging of the inertia link torsion spring 88, from the first rotational position corresponding to the unlocked condition of the latch to the second rotational position corresponding to the locked condition of the latch. As a consequence of this forward rotation of the inertia link 76, the latch pin 96 on the upper extending arm 54 of the latch 52 enters and is displaced within the stop slot portion 86 of the L-shaped slot 80, which restrains further movement of the latch 52 and thereby prevents movement of the lower seat cushion assembly 20 from the raised stowed position to the lowered deployed position due to the interaction of bearing surface 60 and stop surface 48. Upon the termination of the sudden deceleration event, the inertia link torsion spring 88 returns the inertia link 76 to the first rotational position, withdrawing the latch pin 96 on the upper extending arm 54 of the latch 52 from the stop slot portion 86 of the L-shaped slot 80, thereby allowing movement of the lower seat cushion assembly 20 from the raised stowed position to the lowered deployed position. cushion 22 is pivoted between the lowered deployed position and the raised stowed position, as the bearing surface 60 of the latch 52 moves relative to the stop surface 48 of the stop plate 44. The inertia link 76 is maintained in the first rotational position by the urging of the inertia link torsion spring 88 to facilitate movement of the latch pin 96 within the displacement slot 84.

Thus, in accordance with the present disclosure, the inertia link 76 moves from the first rotational position to the second rotational position in the event of a sudden deceleration of the motor vehicle, preferably in the event the deceleration of the motor vehicle 6 exceeds the predetermined deceleration, for example, when the deceleration exceeds 2 Gs. However, it should be noted that the level of the sudden deceleration according to the present disclosure can be readily modified by changing the mass of the inertia link 76, the spring rate of the inertia link torsion spring 88, and the friction provided at the interface between the inertia link 76 and the frame assembly 24 at pivot P'''.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A seating assembly for a motor vehicle comprising:
a seat support bracket;
a lower seat cushion assembly comprising a lower seat cushion and a frame assembly pivotally and operatively coupled at a rear portion thereof to the seat support bracket and pivotable between a lowered deployed position and a raised stowed position;
a stop surface provided on the seat support bracket;
a latch pivotally and operatively coupled to the frame assembly of the lower seat cushion assembly, the latch having a bearing surface adapted for engagement against the stop surface and having an unlocked condition, wherein the bearing surface of the latch may move relative to the stop surface, and a locked condition, wherein the bearing surface of the latch is retained in engagement against the stop surface when the lower seat cushion assembly is in the raised stowed position; and
an inertia link pivotally and operatively coupled with the frame assembly of the lower seat cushion assembly and operatively coupled with the latch, the inertia link having a first rotational position corresponding to the unlocked condition of the latch allowing movement of the lower seat cushion assembly from the raised stowed position to the lowered deployed position and a second rotational position corresponding to the locked condition of the latch preventing movement of the lower seat cushion assembly from the raised stowed position to the lowered deployed position, the inertia link moving from the first position to the second position upon a predetermined deceleration of the motor vehicle.

2. The motor vehicle seating assembly of claim 1, wherein the latch has an upper extending arm and a lower descending arm, the lower descending arm having a curvilinear lower portion that defines the bearing surface, and the seat support bracket comprises a curvilinear upper portion that defines the stop surface.

3. The motor vehicle seating assembly of claim 2, wherein the upper extending arm of the latch comprises a latch pin and the inertia link comprises a slot within which the latch pin is slidably received.

4. The motor vehicle seating assembly of claim 3, wherein the slot comprises an L-shaped slot having a displacement slot portion orientated substantially in line with a pivot of the inertia link and a stop slot portion orientated substantially orthogonally to the displacement slot portion.

5. The motor vehicle seating assembly of claim 4, wherein the latch pin translates within the displacement slot portion of the L-shaped slot when the lower seat cushion is pivoted between the lowered deployed position and the raised stowed position as the bearing surface of the latch moves relative to the stop surface.

6. The motor vehicle seating assembly of claim 5, wherein the latch further comprises a resilient member urging the lower descending arm of the latch against the stop surface to resiliently maintain the lower seat cushion assembly in the raised stowed position.

7. The motor vehicle seating assembly of claim 6, wherein the resilient member comprises a latch torsion spring mounted about a pivot of the latch mounted to the lower seat cushion, the latch torsion spring having a first leg operably coupled to the upper extending arm of the latch and a second leg operably coupled with the lower seat cushion assembly.

8. The motor vehicle seating assembly of claim 1, wherein the inertia link further comprises a resilient member urging the inertia link to the first rotational position when the lower seat cushion assembly is in the raised stowed position.

9. The motor vehicle seating assembly of claim 8, wherein the resilient member comprises an inertia link torsion spring mounted about a pivot of the inertia link mounted to the lower seat cushion, the inertia link torsion spring having a first leg operably coupled to the inertia link and a second leg operably coupled with the lower seat cushion assembly.

10. The motor vehicle seating assembly of claim 1, wherein the inertia link moves from the first position to the second position upon the predetermined deceleration of the motor vehicle exceeding 2 Gs.

11. A seating assembly comprising:
a support bracket comprising a stop surface;
a seat cushion assembly comprising a frame assembly pivotally mounted at a rear portion thereof to the support bracket;
a latch pivotally mounted to the frame assembly of the seat cushion assembly in a raised stowed position having a locked condition retaining a bearing surface of the latch against the stop surface; and
a pivotal inertia link placing the latch in the locked condition upon a predetermined deceleration.

12. The seating assembly of claim 11, wherein the seat cushion assembly comprises a frame assembly and a cushion joined with the frame assembly, wherein the frame assembly is pivotally mounted to the support bracket and the cushion of the seat cushion assembly is pivotable between a lowered deployed position and a raised stowed position.

13. The seating assembly of claim 12, further comprising a stop plate operably coupled to the support bracket, the stop plate comprising a curvilinear upper portion that defines the stop surface,
wherein the latch comprises an upper extending arm and a lower descending arm, the upper extending arm of the latch comprising a latch pin and the lower descending arm comprising a curvilinear lower portion that defines the bearing surface, and
the inertia link comprises an L-shaped slot within which the latch pin is slidably received, the L-shaped slot further comprising a displacement slot portion oriented substantially in line with a pivot of the inertia link, and a stop slot portion orientated substantially orthogonally to the displacement slot portion such that the latch pin translates within the displacement slot portion of the slot when the lower seat cushion assembly is pivoted between the lowered deployed position and the raised stowed position as the bearing surface of the latch moves relative to the stop surface of the stop plate, and the latch pin translates within the stop slot portion upon the predetermined deceleration.

14. The seating assembly of claim 13, wherein the latch further comprises a latch torsion spring mounted about a pivot of the latch, the latch torsion spring having a first leg operably coupled to the extending arm portion of the latch urging the lower descending arm of the latch against the stop surface of the stop plate to resiliently maintain the lower seat cushion assembly in the raised stowed position and a second leg operably coupled with the lower seat cushion assembly.

15. The seating assembly of claim 14, wherein the inertia link further comprises an inertia link torsion spring mounted about a pivot of the inertia link, the inertia link torsion spring having a first leg operably coupled to the inertia link urging the inertia link to an unlocked condition when the lower seat cushion assembly is in the raised stowed position and a second leg operably coupled with the lower seat cushion assembly.

16. A method of retaining a lower seat cushion assembly of a motor vehicle in a raised stowed position upon a predetermined sudden deceleration of the motor vehicle, the lower seat cushion assembly comprising a frame assembly and a lower seat cushion joined with the frame assembly, wherein the frame assembly is pivotally mounted at a rear portion thereof to a seat support bracket and the lower seat cushion assembly is pivotable between a lowered deployed position and the raised stowed position, the method comprising the steps of:
pivotally mounting a latch to the frame assembly of the lower seat cushion assembly, the latch having an unlocked condition, wherein a bearing surface of the latch may move relative to a stop surface on the seat support bracket, and a locked condition, wherein the bearing surface of the latch is retained against the stop surface on the seat support bracket;
pivotally mounting an inertia link to the frame assembly of the lower seat cushion assembly, the inertia link having a first rotational position corresponding to the unlocked condition of the latch allowing movement of the lower seat cushion assembly between the raised stowed position and the lowered deployed position and a second rotational position corresponding to the locked condition of the latch preventing movement of the lower seat cushion assembly from the raised stowed position to the lowered deployed position; and
moving the inertia link from the first rotational position to the second rotational position upon the predetermined deceleration of the motor vehicle.

17. The method of claim 16, wherein the latch comprises an upper extending arm and a lower descending arm, the lower descending arm having a curvilinear lower portion that defines the bearing surface, and the seat support bracket further comprises a stop plate mounted thereto, the stop plate comprising a curvilinear upper portion that defines the stop surface.

18. The method of claim 17, further comprising the step of:

mounting a latch torsion spring about a pivot of the latch, wherein the latch torsion spring comprises a first leg operably coupled to the extending arm portion of the latch urging the lower descending arm of the latch against the stop surface of the stop plate to resiliently maintain the lower seat cushion assembly in the raised stowed position and a second leg operably coupled with the lower seat cushion assembly.

19. The method of claim 18, further comprising the step of:

mounting an inertia link torsion spring about a pivot of the inertia link, wherein the inertia link torsion spring comprises a first leg operably coupled to the inertia link urging the inertia link to the first rotational position when the lower seat cushion assembly is in the raised stowed position and a second leg operably coupled with the lower seat cushion assembly.

20. The method of claim 19, further comprising the steps of:

providing the upper extending arm of the latch with a latch pin;

providing the inertia link with an L-shaped slot within which the latch pin is slidably received, wherein the L-shaped slot further comprises a displacement slot portion orientated substantially in line with the pivot of the inertia link and a stop slot portion orientated substantially orthogonally to the displacement slot portion;

displacing the latch pin within the displacement slot portion of the L-shaped slot when the lower seat cushion assembly is pivoted between the lowered deployed position and the raised stowed position as the bearing surface of the latch moves relative to the stop surface of the stop plate; and displacing the latch pin within the stop slot portion of the L-shaped slot upon the predetermined deceleration of the motor vehicle.

* * * * *